US012410625B2

(12) United States Patent
Simmonds et al.

(10) Patent No.: US 12,410,625 B2
(45) Date of Patent: Sep. 9, 2025

(54) BUILDING SITE DEVICE HAVING A CLIMBING FORMWORK AND AN ELEVATOR SYSTEM

(71) Applicant: Inventio AG, Hergiswil (CH)

(72) Inventors: Oliver Simmonds, Lucerne (CH); Stefan Weber, Niederwil (CH); Christian Studer, Kriens (CH); Gabriele Bizzozero, Gisikon (CH)

(73) Assignee: INVENTIO AG, Hergiswil (CH)

(*) Notice: Subject to any disclaimer, the term of this patent is extended or adjusted under 35 U.S.C. 154(b) by 945 days.

(21) Appl. No.: 17/309,305

(22) PCT Filed: Dec. 13, 2019

(86) PCT No.: PCT/EP2019/085077
§ 371 (c)(1),
(2) Date: May 18, 2021

(87) PCT Pub. No.: WO2020/126906
PCT Pub. Date: Jun. 25, 2020

(65) Prior Publication Data

US 2022/0010570 A1 Jan. 13, 2022

(30) Foreign Application Priority Data

Dec. 18, 2018 (EP) .................................... 18213786
Jan. 21, 2019 (EP) .................................... 19152919

(51) Int. Cl.
*E04G 11/28* (2006.01)
*B66B 9/187* (2006.01)
(Continued)

(52) U.S. Cl.
CPC .............. *E04G 11/28* (2013.01); *B66B 9/187* (2013.01); *B66B 11/008* (2013.01); *E04G 1/367* (2013.01); *E04G 3/32* (2013.01)

(58) Field of Classification Search
CPC ........... E04G 1/367; E04G 3/32; E04G 11/28; B66B 9/187; B66B 11/008
See application file for complete search history.

(56) References Cited

U.S. PATENT DOCUMENTS 3,207,263 A * 9/1965 Cull ........................ B66B 9/187 187/241
3,252,199 A * 5/1966 Bossner .................. E04G 11/28 425/DIG. 126
(Continued)

FOREIGN PATENT DOCUMENTS

AU 597836 B2 6/1990
CN 101077751 A 11/2007
(Continued)

*Primary Examiner* — Colleen M Chavchavadze
(74) *Attorney, Agent, or Firm* — Patrick B. Horne; Shumaker, Loop & Kendrick, LLP

(57) ABSTRACT

A building site device includes a climbing formwork platform for the floor-by-floor production of concreting portions of a building core having at least one elevator shaft. An elevator system has an elevator machine platform vertically movable in the elevator shaft. In order to minimize the use of lifting cranes and the manual raising of supporting structures, the elevator machine platform can be moved jointly with the climbing formwork platform.

8 Claims, 6 Drawing Sheets

(51) Int. Cl.

| | |
|---|---|
| ***B66B 11/00*** | (2006.01) |
| ***E04G 1/36*** | (2006.01) |
| ***E04G 3/32*** | (2006.01) |

(56) References Cited

U.S. PATENT DOCUMENTS

| | | | | | |
|---|---|---|---|---|---|
| 3,973,885 | A * | 8/1976 | Schmidt | E04G 11/24 | 425/65 |
| 4,378,860 | A * | 4/1983 | Newberry | E04G 3/30 | 182/14 |
| 4,562,989 | A * | 1/1986 | Scheller | E04G 11/28 | 249/19 |
| 4,979,589 | A * | 12/1990 | Sugiyama | E04G 21/24 | 182/138 |
| 5,630,482 | A * | 5/1997 | Schw orer | E04G 11/28 | 425/65 |
| 6,260,311 | B1 * | 7/2001 | Vladikovic | E04G 11/28 | 52/114 |
| 6,276,912 | B1 * | 8/2001 | Rock | E04G 11/28 | 249/20 |
| 7,513,480 | B2 * | 4/2009 | Bergaretxe | E04G 11/28 | 249/20 |
| 7,635,049 | B2 * | 12/2009 | Van Der Meijden | B66B 19/002 | 187/401 |
| 8,616,340 | B2 * | 12/2013 | Peacock | B66B 19/00 | 52/741.1 |
| 8,673,189 | B2 * | 3/2014 | Schwoerer | E04G 11/28 | 249/20 |
| 9,604,820 | B2 * | 3/2017 | De Jong | B66B 19/002 | |
| 10,036,170 | B2 * | 7/2018 | Panseri | E04G 11/28 | |
| 10,077,564 | B1 * | 9/2018 | Gruebler | E04G 19/003 | |
| 10,711,470 | B2 * | 7/2020 | Vogl | E04G 11/32 | |
| 11,208,296 | B2 * | 12/2021 | Christen | B66B 19/002 | |
| 11,359,390 | B2 * | 6/2022 | Deifel | E04G 11/28 | |
| 11,858,778 | B2 * | 1/2024 | Studer | B66B 9/00 | |
| 2010/0038518 | A1 * | 2/2010 | Schwoerer | E04G 11/28 | 249/20 |
| 2012/0291395 | A1 * | 11/2012 | Plathin | B66B 19/02 | 52/741.1 |
| 2014/0000987 | A1 * | 1/2014 | Peacock | B66B 9/187 | 187/414 |
| 2015/0298940 | A1 * | 10/2015 | Hense | B66B 5/04 | 187/254 |
| 2016/0152442 | A1 * | 6/2016 | Weber | B66B 19/00 | 187/359 |
| 2018/0273349 | A1 * | 9/2018 | Weibel | B66B 7/024 | |
| 2019/0276277 | A1 * | 9/2019 | Christen | B66B 19/00 | |

FOREIGN PATENT DOCUMENTS

| | | | |
|---|---|---|---|
| CN | 101225708 | A | 7/2008 |
| CN | 201635390 | U | 11/2010 |
| CN | 201671326 | U | 12/2010 |
| CN | 102296808 | A | 12/2011 |
| CN | 102587643 | A | 7/2012 |
| CN | 102661039 | A | 9/2012 |
| CN | 104066670 | A | 9/2014 |
| CN | 106639500 | A | 5/2017 |
| CN | 207513158 | U | 6/2018 |
| EP | 2636629 | A1 | 9/2013 |
| GB | 2217296 | A | 10/1989 |
| JP | H01192917 | A | 8/1989 |
| RU | 2152494 | C1 | 7/2000 |
| TW | M537129 | U | 2/2017 |
| WO | 2013107932 | A1 | 7/2013 |
| WO | 2018042638 | A1 | 3/2018 |

* cited by examiner

BUILDING SITE DEVICE HAVING A CLIMBING FORMWORK AND AN ELEVATOR SYSTEM

FIELD

The present invention relates to the field of building sites of high-rise buildings. It relates to a building site device having a climbing formwork platform and an elevator system.

BACKGROUND

Climbing formworks belong to the discontinuous formwork systems and are used to manufacture tower-like components/structures. They can be used, for example, to produce the concreting portions of a high-rise building core in a floor-by-floor manner. Construction joints with the connecting reinforcement for the next portion are formed between the portions and the forces of the individual climbing units are introduced into the production portion concreted last. For this purpose, anchors in conjunction with screwed-on suspension shoes create fastening points that introduce the loads into the reinforced concrete. The freshly concreted production portion is not loaded by the climbing formwork. As with standard wall formworks, the load is diverted from the fresh concrete pressure via formwork anchor systems.

The first wall portion is boarded conventionally. Lead anchors serving as suspension points for the climbing brackets are also installed. In the meantime, the climbing bracket and the working platform are prepared and, if necessary, climbing devices with hydraulic cylinders are installed.

After the first concreting portion has been stripped, suspension shoes are mounted and the climbing brackets are hooked in. The formwork (girder or frame formwork) is placed on the climbing brackets and connected; the formwork panel is moved toward the previous concreting portion and set up. The formwork can be adjusted horizontally and vertically by adjusting devices. The lead anchors are attached to the formwork and then the reinforcement work is carried out. The closing formwork is moved to the concreting position, the formwork is anchored and then concreted.

The second concreting portion is stripped and the formwork is cleaned. After mounting the suspension shoes in the second concreting portion, the climbing profiles are threaded in with the crane and secured on the suspension shoes. The hydraulic lines are laid and connected to the hydraulic unit and the hydraulic cylinders of the climbing devices. Then the climbing unit is transferred to the next portion. The finishing platforms can be installed after or during the climbing of the climbing units (depending on the structure and building site conditions).

If a hydraulic climbing device lifts the units to the next floor, it is referred to as a self-climbing formwork. With this crane-independent variant, suitable climbing shoes ensure the secure anchoring on the structure. Self-climbing formworks are offered with permanently integrated climbing drives or also with mobile lifting cylinders. The advantage of mobile systems lies in the lower number of hydraulic sets and the resulting lower device costs. However, the additional expenditure for manipulating the mobile lifting systems must be taken into account in the wage costs. In addition, the advance climbing of the climbing profile, which in this case is integrated into the climbing bracket, is omitted during the climbing process. In the case of self-climbing formworks, the mobile hydraulic system is particularly economical for mid-rise buildings between 10 and 30 floors.

Self-climbing formworks can also be combined to form large self-climbing platforms. These platforms are used in high-rise building cores and carry the entire interior and exterior formwork. In the case of advancing cores, the external platforms including the housing are also mounted on the platform. If the core walls are concreted together with the floor slabs, the external platforms are not required.

One variant are self-climbing shaft formworks which implement the interior formwork of elevator shafts or stairwells by means of only one central climbing device.

On building sites of high-rise buildings, so-called climbing or jumping elevators are increasingly used as building site elevators, which grow along with the building in order to transport people and materials within the building. Such a jumping elevator has a provisional, vertically movable elevator machine platform which is usually raised step by step within the elevator shaft by means of a lifting platform. The elevator car is arranged below the temporary elevator machine platform and can already be used in the region below the temporary elevator machine platform during the construction phase. As soon as a few more floors above the temporary elevator machine platform have been completed, the elevator machine platform can be raised and the operating range of the elevator can thus be extended upwards.

From EP 2636629A1, a building site elevator is known which comprises an elevator shaft, an elevator unit movable in the elevator shaft and at least one elevator car. A first movable supporting structure for supporting the elevator unit is arranged in the elevator shaft. Furthermore, a roof structure is arranged above the supporting structure, which can be moved upwards in the elevator shaft by means of a second supporting structure arranged above the roof structure.

The problem with existing building site elevators is that, regardless of how many supporting structures are provided for raising subjacent elevator units and/or further supporting structures, the respective top supporting structure must first be raised again by means of a lifting crane or manually before subjacent elements can be raised.

SUMMARY

Therefore, the problem addressed is that of integrating an elevator system into a building site device such that the use of a lifting crane and the manual raising of supporting structures can be minimized.

The building site device according to the invention has a climbing formwork platform for the floor-by-floor production of concreting portions of an elevator shaft, a plurality of elevator shafts or a housing core which comprises one or more elevator shafts, and an elevator system having an elevator machine platform which is vertically movable in an elevator shaft. For this purpose, the elevator machine platform is connected to the climbing formwork platform such that the elevator machine platform is movable jointly with the climbing formwork platform when the climbing formwork platform is advanced.

In a first embodiment, the elevator machine platform is integrated in the climbing formwork platform, so that the elevator machine platform can be moved directly and jointly with the climbing formwork platform. This can optionally be realized directly by arranging elevator machine elements on the climbing formwork platform or optionally by coupling the elevator machine platform to the climbing formwork platform, wherein a rigid connection by means of a connecting web or a fixed suspension by means of a suspension element of a predetermined length can be provided for the coupling of the two platforms.

Therefore, an additional raising of the machine platform is unnecessary. In addition, the space below the climbing formwork platform can be optimally used, and the floors directly below the climbing formwork platform can be approached with the car of the elevator system.

In a second embodiment, the elevator machine platform is suspended on the climbing formwork platform in a vertically movable manner with respect to the climbing formwork platform. In this case, lifting means of variable length provided for this purpose can be arranged between the elevator machine platform and the climbing formwork platform. In particular, winches or other rope, chain or belt drives can be provided hereto, wherein the ropes, chains or belts can be suspended directly or via one or more deflection pulleys. By using deflection pulleys, the forces can be distributed over several portions, thus increasing the overall lifting capacity.

The elevator machine platform can thus be raised without an additional supporting structure having to be mounted in the elevator shaft above the elevator machine platform and manually raised or carried upwards.

In a third embodiment, a lifting platform is suspended on the climbing formwork platform in a vertically movable manner with respect to the climbing formwork platform and the elevator machine platform is suspended on the lifting platform in a vertically movable manner with respect to the lifting platform. Lifting means of variable length provided for this purpose can once again be arranged between the lifting platform and the climbing formwork platform and/or between the elevator machine platform and the lifting platform. In particular, winches or other rope, chain or belt drives can again be provided hereto, wherein the ropes, chains or belts can be suspended directly or via one or more deflection pulleys. Once again, it applies that by using deflection pulleys, the forces can be distributed over several portions, thus increasing the overall lifting capacity.

The elevator machine platform can thus be raised without an additional supporting structure having to be mounted in the elevator shaft above the elevator machine platform and manually raised or carried upwards. Due to the lifting platform, the forces on the climbing formwork platform can be reduced because only the weight of the lighter lifting platform acts on the climbing formwork platform while the weight of the significantly heavier elevator machine platform acts on the separately supported lifting platform.

Optionally, the climbing formwork platform is designed as self-climbing formwork platforms and has integrated climbing drives.

As a result, construction cranes for raising the climbing formwork platform can be forgone.

The elevator machine platform is optionally attached directly to the integrated climbing drives of the climbing formwork platform. As a result, the elevator machine platform can be raised directly or indirectly with the climbing formwork platform analogously to the three above-mentioned embodiments, wherein the elevator machine platform is fastened directly to the elevator shaft walls via the integrated climbing drives. If, for example, in the case of a hydraulic climbing drive, the climbing formwork platform is attached to the tip of the piston rod and the elevator machine platform is attached (directly or indirectly via a further lifting platform arranged in between) to the hydraulic cylinder in the region of its climbing brackets in the elevator shaft walls, the climbing formwork platform, in the case of an advancing climbing formwork platform, can be raised in a first advancing step by extending the piston rods and anchored in the new position, while in a second advancing step which is temporally independent of the first advancing step, the hydraulic cylinder is pulled up by retracting the piston rod, thereby raising the elevator machine platform connected to the hydraulic cylinder.

Due to this separation of the advance into two steps, those responsible for raising the climbing formwork platform can freely choose the point in time for raising the platform independently of those responsible for the elevator. Those responsible for raising the elevator machine platform can thus also freely choose the point in time for raising the elevator machine platform. This is possible, even though both use the same climbing drives for their respective raising of their platform.

Optionally, the climbing formwork platform is suspended in anchors in the elevator shaft walls on a floor-by-floor basis and the elevator machine platform is secured in anchors previously used to suspend the climbing formwork platform on subjacent floors. In the presence of a lifting platform according to the third embodiment, said lifting platform is optionally also secured in anchors previously used to suspend the climbing formwork platform on subjacent floors.

Therefore, no separate fastening devices for the elevator machine platform and/or the lifting platform are required.

In the following, embodiments of the building site device according to the invention will be described in detail with reference to figures.

DETAILED DESCRIPTION

An elevator shaft 1 of a building under construction is schematically shown in FIGS. 1 to 4 and 6. Further building parts outside of the respective elevator shaft shown are not depicted in these figures. The elevator shaft represents the actual housing core which usually comprises one or more such elevator shafts. The special feature of the elevator shafts is their vertical extension which in the case of certain elevator shafts can practically extend over the entire height of the building. Elevator shafts of this type are particularly suitable for the use of building site elevators which already enable people and goods to be transported from and to the lower floors during the construction phase of the building. In this case, the lower floors are those floors which are located below the uppermost floors that are still under construction.

Figure 1:
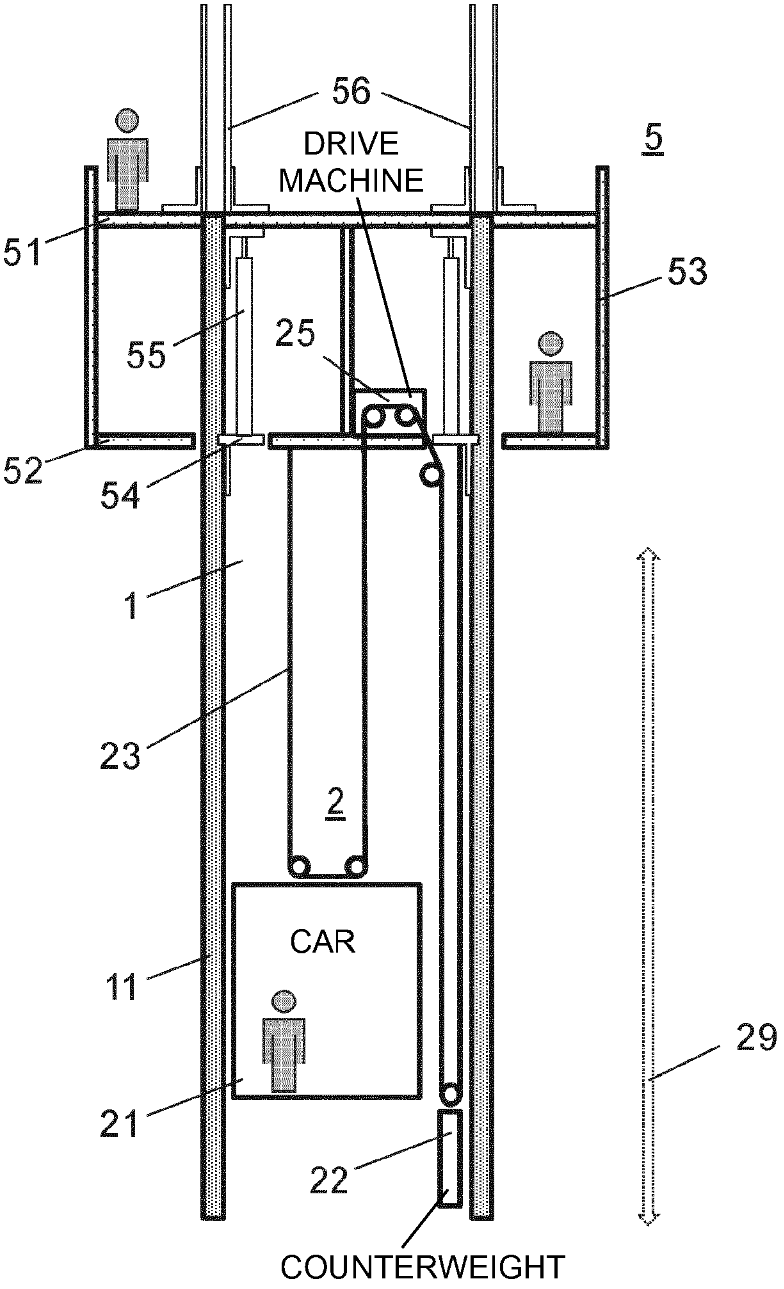
FIG. 1 schematically shows a first embodiment of a building site device according to the invention having a climbing formwork platform for concreting an elevator shaft.

FIG. 1 shows a first embodiment of a building site device according to the invention in which a climbing formwork platform 5 is connected directly to a building site elevator. In the depicted embodiment, the climbing formwork platform 5 has two working platforms, an upper working platform 51 which runs continuously and along the upper edge of the concrete walls 11 last stripped, and a lower working platform 52 which allows access to the wall portions already stripped, for example, to make repair work on the wall possible.

Figure 5:
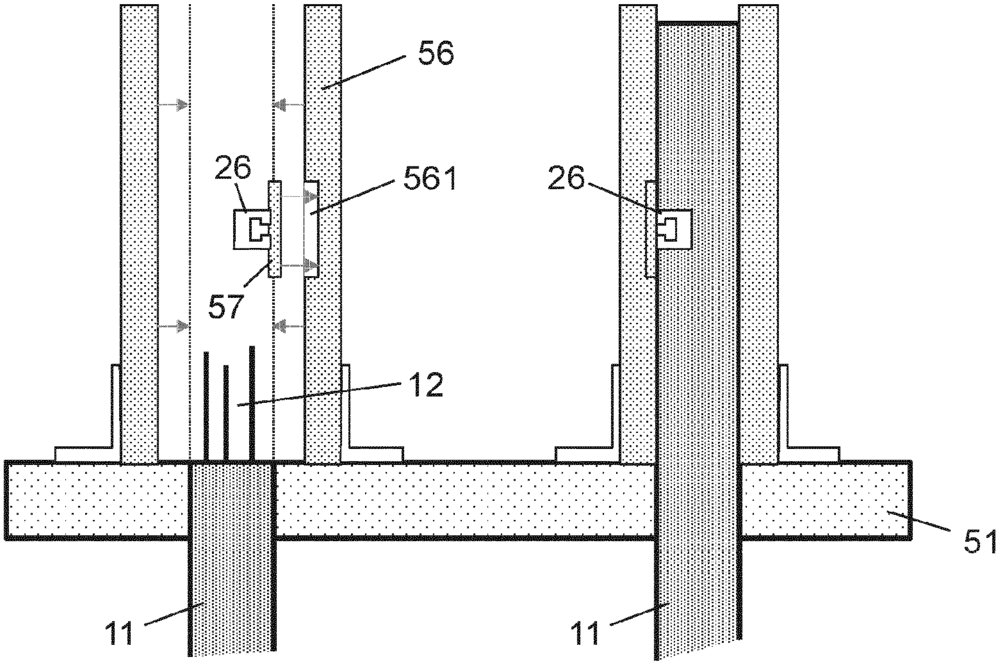
FIG. 5 schematically shows the introduction of auxiliary means for fastening elevator components before concreting.

The formworks for concreting are located on the upper working platform. As shown in detail in FIG. 5, the formwork 56 can be adjusted horizontally and vertically by means of adjusting devices. Before the concrete is poured, the reinforcement work is carried out, i.e., as a rule, reinforcement rods 12 are introduced as well as the anchors for future support of the platform. Optionally, additional auxiliary elements can also be embedded in the concrete, for example, C-rail profiles or anchor bolts which can later be used to attach brackets for accommodating the guide rails of the elevator. For this purpose, recesses 561 can be provided in the formworks 56, into which inserts 57 can be inserted with an auxiliary element—the C-rail profiles 26 as an example in the drawing—fastened, in particular clamped, thereto. Optionally, the auxiliary elements can also be placed directly onto bolts that are attached to the formwork. Due to the inserts in the formworks or the bolts at predefined points, the auxiliary elements are always arranged on each floor at the same point in the shaft and are therefore ideally suited for manual, semi-manual or automated installation of further elevator components.

Optionally, optical images can be taken of the reinforcement rods installed in the future wall region and a digital model of the reinforcement rods along the entire elevator shaft can be created. For this purpose, a 3D camera or a 3D scanner based on laser technology or electromagnetic waves outside the visible range is advantageously used. This can be particularly helpful later during the manual, semi-manual or fully automatic drilling of holes because drilling into or through reinforcement rods thus can be avoided and the tool can be protected. The closing formwork is moved to the concreting position, the formwork is anchored and then concreted (right half of FIG. 5).

The lower working platform 52 is firmly connected to the upper working platform 51 via a boom structure and vertically running supporting structures 53. The entire platform is shown as an integral unit which can be moved as a unit in the vertical direction. Optionally, individual sub-platforms of the climbing formwork platform can be moved individually and independently of one another which, however, is not shown in the present figures. For raising the climbing formwork platform, climbing brackets 54 are attached to the anchors in the walls, to which hydraulic climbing devices 55 are attached. After raising, the climbing formwork platform is again suspended in anchors in the elevator shaft walls.

The elevator system contained in the first embodiment of the building site device according to the invention comprises an elevator 2 having an elevator car 21 connected to a counterweight 22 via a suspension element 23. The drive machine 25 of the elevator system is arranged on a temporary elevator machine platform integrated in the climbing formwork platform. Therefore, an additional raising of the machine platform is unnecessary. In addition, the space below the climbing formwork platform can be optimally used, and the floors directly below the climbing formwork platform can be approached with the car of the elevator system. The elevator operation 29 must be interrupted each time the climbing formwork platform climbs up by one floor. In order to continue to be able to serve the lowest floors, the suspension elements must either be extended on each floor or after a specified number of floors. In particular, if the elevator shaft also extends into the basement region of a building, the respectively served lowest floor can come to lie a few floors below the ground floor, which is usually important for the construction work, when the suspension elements are extended. The ground floor can then also be served after several floor extensions without an additional extension of the suspension elements, which can be advantageous for minimizing the number of suspension element extensions.

Figure 2:
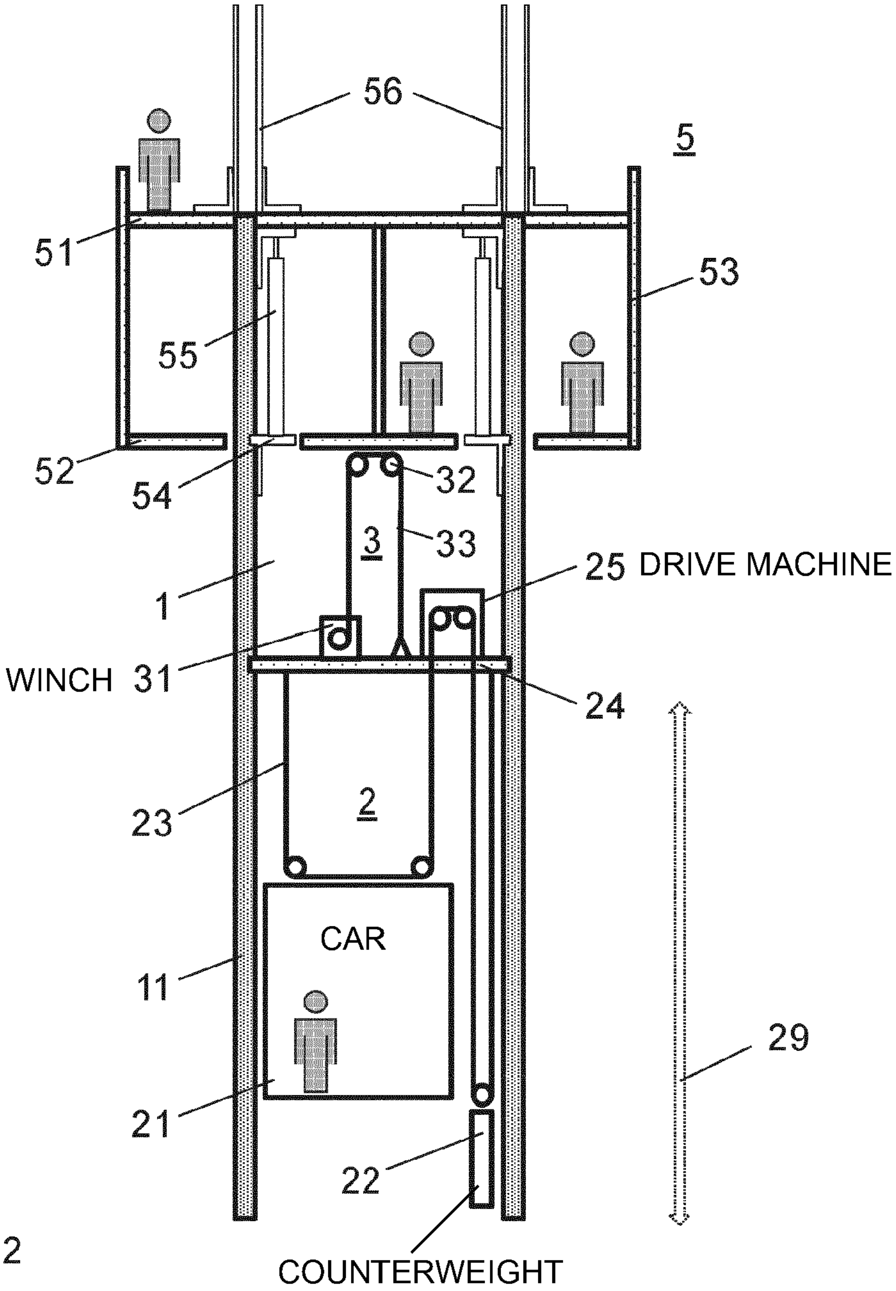
FIG. 2 schematically shows a second embodiment of a building site device according to the invention having a climbing formwork platform for concreting an elevator shaft.
Figure 3:
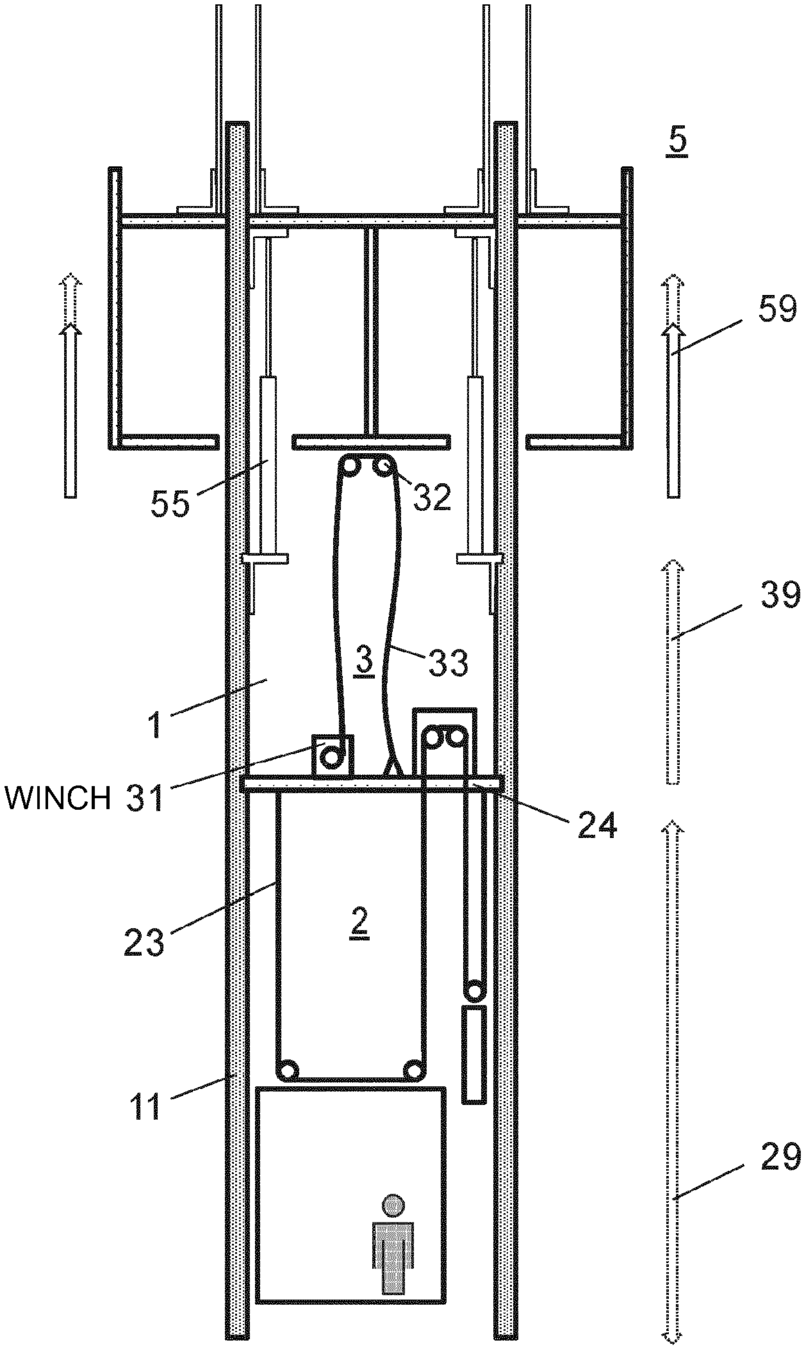
FIG. 3 schematically shows the building site device according to FIG. 2 during the raising of the climbing formwork platform.

FIGS. 2 and 3 show a second embodiment of a building site device according to the invention in which a climbing formwork platform 5 is again connected directly to a building site elevator. Analogous to the first embodiment, the climbing formwork platform 5 again has two working platforms. However, in this embodiment, the drive machine 25 of the elevator system 2 is arranged on a separate elevator machine platform 24. The elevator machine platform is secured in anchors previously used to suspend the climbing formwork platform on subjacent floors. With respect to the climbing formwork platform, the elevator machine platform is movable in the vertical direction, i.e., it is not connected to the climbing formwork platform in a fixed or rigid manner. A lifting means 3 comprising a winch or some other rope, chain or belt drive 31 is arranged on the elevator machine platform. Optionally, the lifting means can also be arranged on the climbing formwork platform. The elevator machine platform can be moved and in particular raised relative to the climbing formwork platform with a suspension element 33, for example, a rope, a chain, or a belt. If deflection rollers 32 are used, as shown in the figure, the forces can be distributed over a plurality of suspension element portions and the overall lifting capacity can thus be increased. If the climbing formwork platform is raised as schematically shown in FIG. 3, the elevator machine platform remains in its place. The suspension element 33 of the lifting means 3 is loosened. During the climbing phase 59 of the climbing formwork platform, the elevator operation 29 can be maintained because everything from the elevator machine platform downwards is independent from the raising of the climbing formwork platform. However, if the elevator machine platform is pulled up after a few climbing phases 59 of the climbing formwork platform, the suspension elements 33 of the lifting means 3 are tensioned again. In order to prevent the force to be applied by the lifting device from becoming too great, the car and/or the counterweight can optionally be placed on the buffer and, if necessary, the counterpart not placed on the buffer can be secured by clamping the suspension element. During lifting 39, the elevator machine platform is raised by one to several floor heights and secured in the anchors in the shaft walls.

Figure 4:
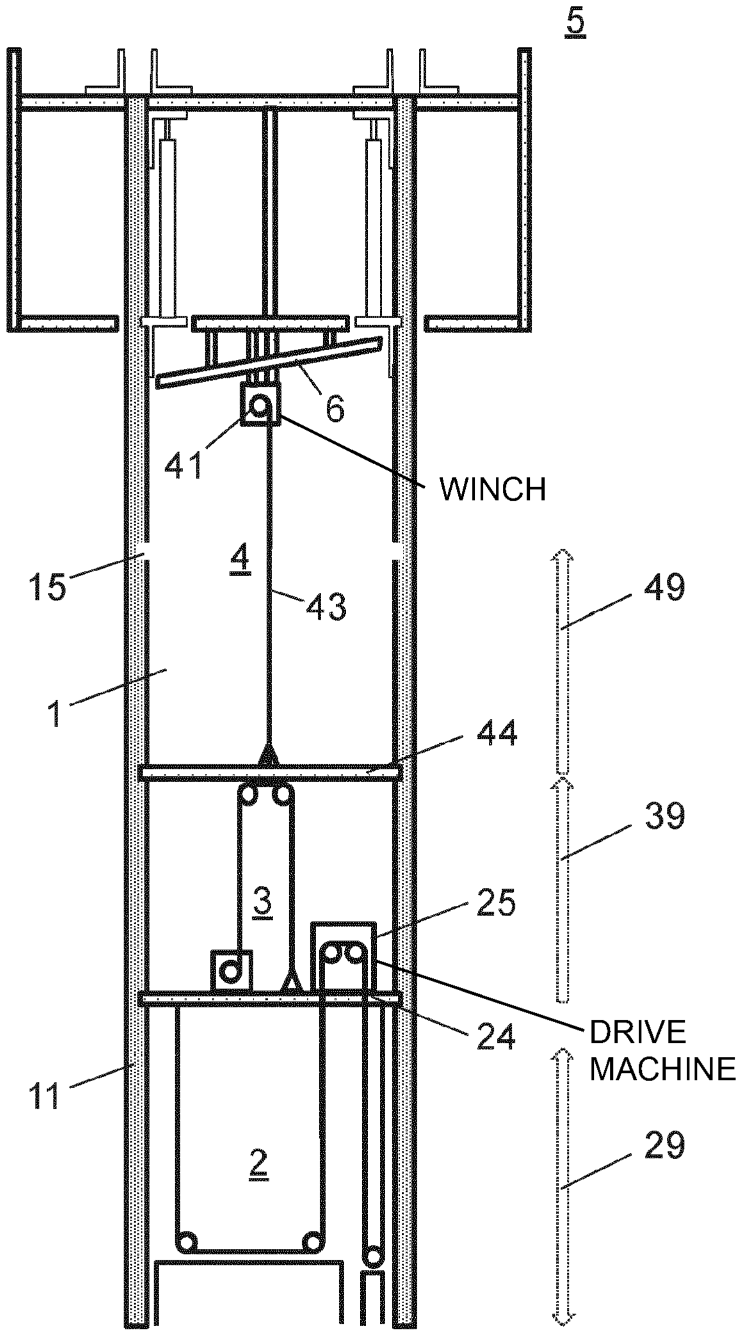
FIG. 4 schematically shows a third embodiment of a building site device according to the invention having a climbing formwork platform for concreting an elevator shaft.

FIG. 4 shows a third embodiment of a building site device according to the invention in which a climbing formwork platform 5 is again connected directly to a building site elevator. Analogous to the first embodiment, the climbing formwork platform 5 again has two working platforms. In this embodiment, the drive machine 25 of the elevator system 2 is once again arranged on a separate elevator machine platform 24 and the elevator machine platform is secured in anchors previously used to suspend the climbing formwork platform on subjacent floors. In addition, a lifting platform 44 is provided between the elevator machine platform 24 and the climbing formwork platform 5. With respect to the climbing formwork platform, the lifting platform, similarly to the elevator machine platform, is movable in the vertical direction, i.e., it is not connected to the climbing formwork platform in a fixed or rigid manner. The lifting platform 44 is secured in anchors previously used to suspend the climbing formwork platform on subjacent floors. A lifting means 4 comprising a winch 41 or some other rope, chain or belt drive is arranged on the climbing formwork platform but can optionally also be arranged on the lifting platform. The lifting platform 44 can be moved and in particular raised relative to the climbing formwork platform with a suspension element 43, for example, a rope, a chain, or a belt. Since the lifting platform 44 is significantly lighter than the elevator machine platform, the lifting means 4 can be dimensioned smaller than the lifting means 3 for raising the elevator machine platform 24, which in turn comprises a winch or some other rope, chain or belt drive and is arranged on the elevator machine platform. With respect to the lifting platform 44, the elevator machine platform can be moved and in particular raised with the suspension element 33, for example, with a rope, a chain, or a belt.

As in the second embodiment, the elevator operation 29 can be maintained during the climbing phase 59 of the climbing formwork platform because everything from the lifting platform 44 downwards is independent from the raising of the climbing formwork platform. However, if the elevator machine platform is supposed to be pulled up after a few climbing phases 59 of the climbing formwork platform, the lifting platform, in a first step, is raised while the suspension elements 33 of the lifting means 3 are loosened. During lifting 49, the lifting platform is raised by one to several floor heights and secured in the anchors 15 in the shaft walls. The elevator machine platform is then raised.

Optionally, a collecting roof element 6 (crash deck) can be provided above the elevator system which is intended to prevent objects from falling into the elevator region. In all embodiments, the collecting roof element 6 can be fastened to the climbing formwork platform directly below the climbing formwork platform as indicated in FIG. 4. Optionally, the collecting roof element 6 can be secured in anchors previously used to suspend the climbing formwork platform on subjacent floors. In this case, the collecting roof element 6 can be raised by one to several floor heights with one of the available lifting means.

Figure 6:
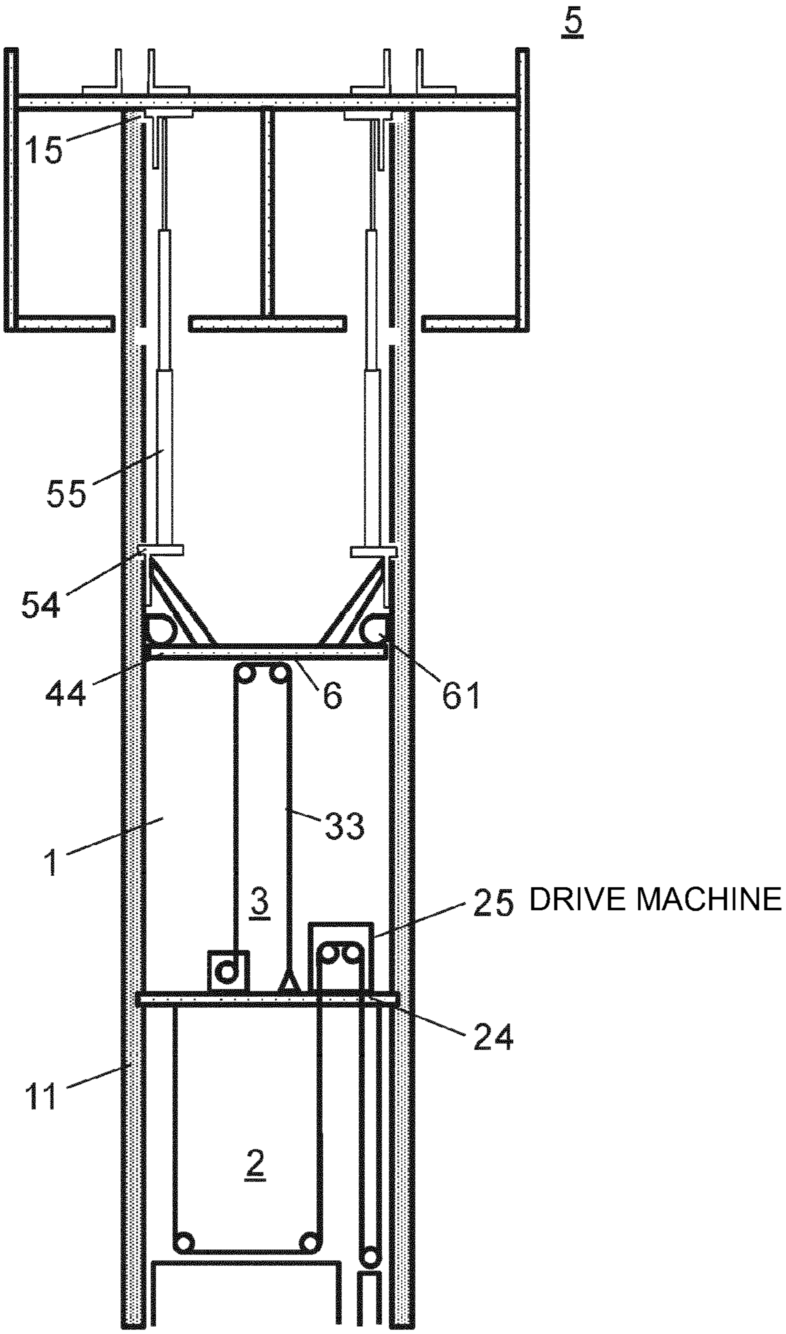
FIG. 6 schematically shows a further embodiment of a building site device according to the invention having a climbing formwork platform for concreting an elevator shaft.

FIG. 6 shows a further embodiment of a building site device according to the invention in which a climbing formwork platform 5 is again connected directly to a building site elevator. Analogous to the first embodiment, the climbing formwork platform 5 again has two working platforms. In this embodiment, the drive machine 25 of the elevator system 2 is once again arranged on a separate elevator machine platform 24 and the elevator machine platform is secured in anchors previously used to suspend the climbing formwork platform on subjacent floors. In addition, a lifting platform 44 is provided between the elevator machine platform 24 and the climbing formwork platform 5. The lifting platform 44 is arranged directly on the climbing brackets 54 or on the hydraulic cylinders of the hydraulic climbing devices (lifting means) 55. In the case of an advancing climbing formwork platform 5, the climbing formwork platform 5 is raised in a first advancing step by extending the piston rods of the hydraulic climbing devices 55 and anchored in the new position at anchors 15, while in a second advancing step which is temporally independent of the first advancing step, the lower climbing brackets 54 are released and the hydraulic cylinder is pulled up by retracting the piston rod, thereby raising the lifting platform 44 connected to the hydraulic cylinder. In this case, the suspension elements 33 of the lifting means 3 for raising the elevator machine platform 24 are loosened during the second advancing step.

Instead of having an additional lifting platform as shown, the elevator machine platform itself can also be arranged directly on the climbing brackets or the hydraulic cylinders of the hydraulic climbing devices (analogous to the first embodiment).

In the embodiment shown in FIG. 6, the lifting platform 44 optionally comprises a collecting roof element 6 (crash deck) which is optionally designed to be watertight and is additionally provided with sealing elements 61. The sealing elements ensure that no water can flow down along the shaft walls. Sealing lips, silicone joints, tar seals, but also inflatable tube elements which press against the wall when inflated, can be used as sealing elements.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A building site device comprising:

a climbing formwork platform including an upper working platform connected to a lower working platform by vertical support structures, with adjustable concrete formworks located on a top side of the upper working platform and adapted to perform a floor-by-floor production of concreting portions of a building core including at least one elevator shaft;

a climbing device installed on the climbing formwork platform, the climbing device being positioned below the upper working platform and adapted to engage a wall of the building core at a previously concreted location and bear compressively upward on the upper working platform to raise the climbing formwork platform relative to the building core;

an elevator system having an elevator machine platform vertically movable in the at least one elevator shaft; and wherein the elevator machine platform is adapted to move jointly with the lower working platform of the climbing formwork platform in the at least one elevator shaft.

2. The building site device according to claim 1 wherein the elevator machine platform is integrated in the climbing formwork platform such that the elevator machine platform is movable directly and jointly with the climbing formwork platform by an elevator drive on the climbing formwork platform or by a coupling of the elevator machine platform to the climbing formwork platform.

3. The building site device according to claim 1 wherein the elevator machine platform is suspended on the climbing formwork platform and is vertically movable relative to the climbing formwork platform by a variable length lifting means arranged between the elevator machine platform and the climbing formwork platform.

4. The building site device according to claim 1 including a lifting platform suspended on the climbing formwork platform and being vertically movable relative to the climbing formwork platform by a variable length lifting means arranged between the lifting platform and the climbing formwork platform, and wherein the elevator machine platform is suspended on the lifting platform and is vertically movable relative to the lifting platform by a variable length lifting means arranged between the elevator machine platform and the lifting platform.

5. The building site device according to claim 1 wherein the climbing formwork platform includes integrated climbing drives of the climbing device and operates as a self-climbing formwork platform.

6. The building site device according to claim 1 wherein the at least one elevator shaft includes a plurality of anchors in elevator shaft walls, wherein the climbing formwork platform is adapted to be suspended in the anchors in the elevator shaft walls on a floor-by-floor basis, and wherein the elevator machine platform is secured in ones of the anchors previously used to suspend the climbing formwork platform on subjacent floors.

7. The building site device according to claim 1 wherein the at least one elevator shaft includes a plurality of anchors in elevator shaft walls, wherein the climbing formwork platform is adapted to be suspended in the anchors in the elevator shaft walls on a floor-by-floor basis, and including a lifting platform suspended on the climbing formwork platform, wherein the lifting platform is secured in ones of the anchors previously used to suspend the climbing formwork platform on subjacent floors.

8. A building site device comprising:

a climbing formwork platform including an upper working platform connected to a lower working platform by vertical support structures, with adjustable concrete formworks located on a top side of the upper working platform and adapted to perform a floor-by-floor production of concreting portions of a building core including at least one elevator shaft;

a climbing device installed on the climbing formwork platform, the climbing device being positioned below the upper working platform and adapted to engage a wall of the building core at a previously concreted location and bear compressively upward on the upper working platform to raise the climbing formwork platform relative to the building core;

an elevator system having an elevator machine platform vertically movable in the at least one elevator shaft and being adapted to move jointly with the climbing formwork platform in the at least one elevator shaft; and wherein the elevator machine platform is a temporary elevator machine platform with a drive machine arranged thereon, the temporary elevator machine platform being integrated in the lower working platform of the climbing formwork platform, or the elevator machine platform has the drive machine arranged thereon and is connected to the lower working platform of the climbing formwork platform by a lifting means.

* * * * *